(12) United States Patent
Obradors et al.

(10) Patent No.: US 6,205,173 B1
(45) Date of Patent: Mar. 20, 2001

(54) COMMUNICATION METHOD AND APPARATUS USING DATA COMPRESSION

(75) Inventors: Joan Obradors, London; Howard Ray Feldman, Kenton, both of (GB); Francois-Arnaud Remael, Pleumeur Bodou (FR)

(73) Assignee: International Mobile Satellite Organization (GB)

( * ) Notice: Subject to any disclaimer, the term of this patent is extended or adjusted under 35 U.S.C. 154(b) by 0 days.

(21) Appl. No.: 08/981,084
(22) PCT Filed: Jun. 14, 1996
(86) PCT No.: PCT/GB96/01415
§ 371 Date: Feb. 27, 1998
§ 102(e) Date: Feb. 27, 1998
(87) PCT Pub. No.: WO97/00561
PCT Pub. Date: Jan. 3, 1997

(30) Foreign Application Priority Data

Jun. 16, 1995 (GB) .................................................. 9512283

(51) Int. Cl.[7] ............................... H04B 1/66; H04B 1/44
(52) U.S. Cl. ...................... 375/240; 375/222; 379/93.05; 455/72
(58) Field of Search ..................................... 375/220, 222, 375/240, 377; 379/93.05, 93.06, 93.07, 93.08, 93.09; 704/500, 503; 455/72, 422

(56) References Cited

U.S. PATENT DOCUMENTS

| 5,307,413 | * | 4/1994 | Denzer | 713/151 |
|---|---|---|---|---|
| 5,337,319 | * | 8/1994 | Furukawa et al. | 714/3 |
| 5,404,394 | * | 4/1995 | Dimolitsas et al. | 379/93.08 |
| 5,850,602 | * | 12/1998 | Tisdale et al. | 455/430 |
| 5,968,149 | * | 10/1999 | Jaquette et al. | 710/68 |
| 5,974,043 | * | 10/1999 | Solomon | 370/352 |

FOREIGN PATENT DOCUMENTS

| C 44 09 128 | 1/1995 | (DE) . |
|---|---|---|
| 0 393 646 | 10/1990 | (EP) . |
| 0 650 270 | 4/1995 | (EP) . |
| WO A 91 15087 | 10/1991 | (WO) . |
| WO A 94 10809 | 5/1994 | (WO) . |

* cited by examiner

Primary Examiner—Young T. Tse
(74) Attorney, Agent, or Firm—Banner & Witcoff, Ltd.

(57) ABSTRACT

A communications link for data communication via satellite includes interface apparatus comprising a satellite link interface for connection to a satellite link and a PSTN interface for connection to a PSTN. The interface apparatus supports different data compression modes in the communication link. Mode A allows data compression over the PSTN but not over the satellite link. Mode B allows data compression over the PSTN and over the satellite link, but enables decompression and recompression of data flowing in each direction through the interface apparatus. Mode C allows compressed data to pass transparently between the PSTN and the satellite link, while the interface apparatus performs error correction on the satellite link and on the PSTN.

17 Claims, 5 Drawing Sheets

COMMUNICATION METHOD AND APPARATUS USING DATA COMPRESSION

TECHNICAL FIELD

The present invention relates to a data communication method and apparatus and in particular to a data interface for connection between first and second communications sub-links.

BACKGROUND ART

One example of a communications link for use in connection with data terminal equipment (DTE) is an asynchronous data service proposed for the INMARSAT-B (TM) or INMARSAT-M (TM) satellite communication systems, as described for example in chapters 12 and 14 of "Satellite Communications: Principles and Applications" by Calcutt and Tetley, First Edition, published by Edward Arnold.

The overall layout of the satellite communication system, when used for data communications, is shown in FIG. 1. A mobile DTE 2 is connected via an RS232 interface to a mobile modem interface unit (MIU) 4. The mobile MIU 4 simulates a modem, so that off-the-shelf communication software may be used in the mobile DTE 2. The MIU 4 provides an interface to a mobile earth station (MES) 6 which allows communication via a satellite 8 to a fixed or land earth station (LES) 10. The LES 10 is connected to a fixed MIU 12 which interfaces the satellite link to a public switched telephone network (PSTN) 14. A fixed DTE 18 is connected to the PSTN 14 through a modem 16 of standard type.

Under good conditions, the PSTN 14 should be capable of supporting bit rates as high as 28,800 bits per second or more. However, the INMARSAT-M satellite link supports a maximum data rate of 2400 bits per second, while the INMARSAT-B system supports a maximum of 9600 bits per second. If an acceptable bit error rate for data communications is to be provided over the satellite links, the data transfer rate must be limited, and so the PSTN link is limited to the data rate available over the satellite link.

The document EP-A-0566407 discloses an interface between a local area network and an RF segment of a terrestrial cellular system, in which compressed voice traffic from a mobile terminal is expanded for transmission to a PSTN, but remains in compressed form if the voice traffic is intended for reception by another mobile terminal, to avoid double coding of speech. However, such an interface does not allow a user to communicate using either compressed or uncompressed data over the same network.

STATEMENT OF INVENTION

According to the present invention, there is provided a data communications interface for connection between a first communications link and a second, radio frequency communications link, which is capable of sending compressed data to and receiving compressed data from either of the communications links. In this way, the information rate through the second communications link may be increased, and when uncompressed data is sent over the first communication link, the first link can operate at a higher data rate than the second communications link. Preferably, the interface apparatus is able to send and receive compressed data over the second communications link, while being able to send data to and receive data from the first communications link in either compressed or uncompressed form. In the former case, the interface is operable to decompress data from one link and to recompress the data for transmission over the other link, so that compression protocols can be operated independently over each link.

BRIEF DESCRIPTION OF THE DRAWINGS

Specific embodiments of the present invention will now be described with reference to the accompanying drawings, in which.

MODES OF CARRYING OUT THE INVENTION

Figure 1:
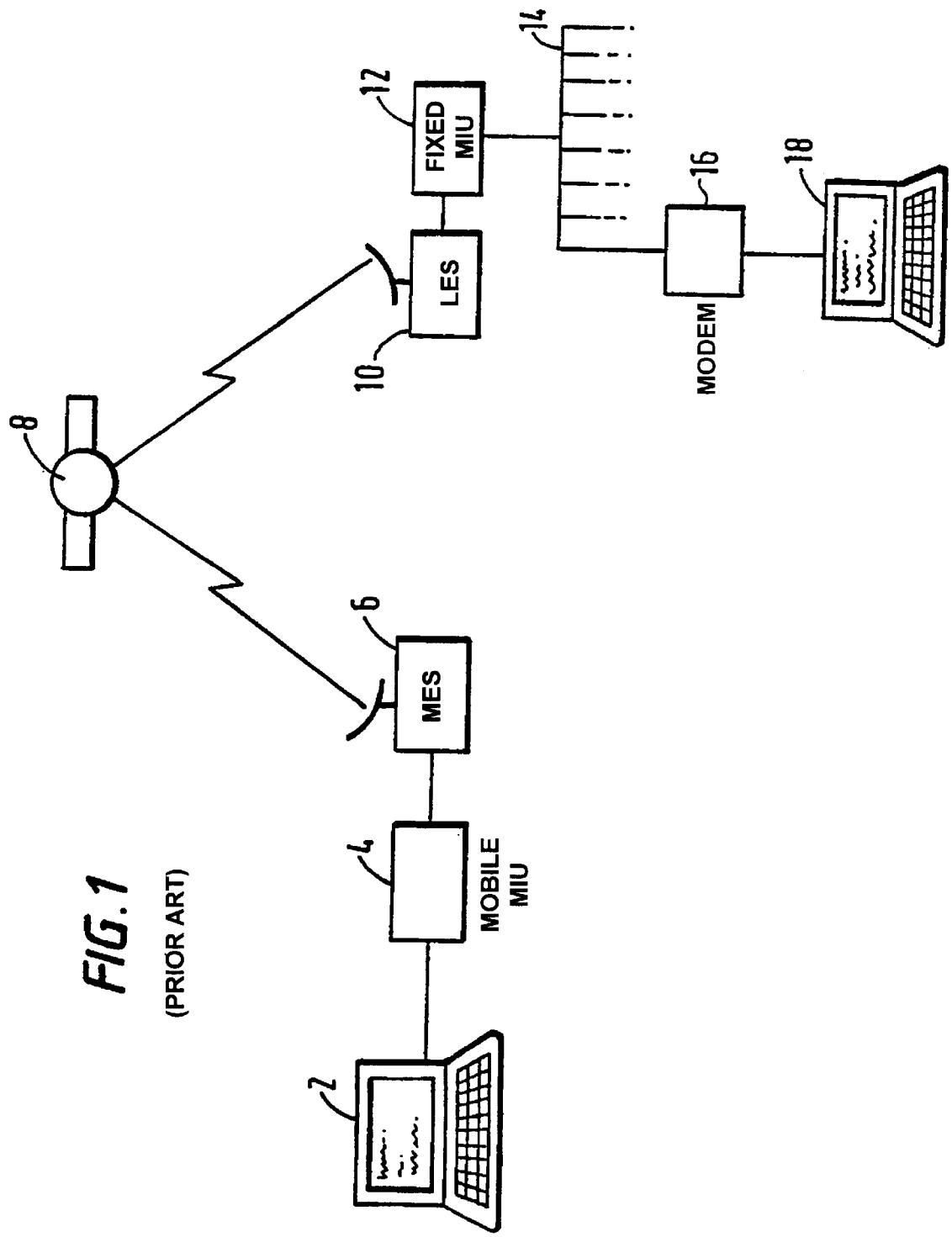
FIG. 1 shows a communications link between data terminals, comprising a satellite sub-link and a terrestrial sub-link.
Figure 2:
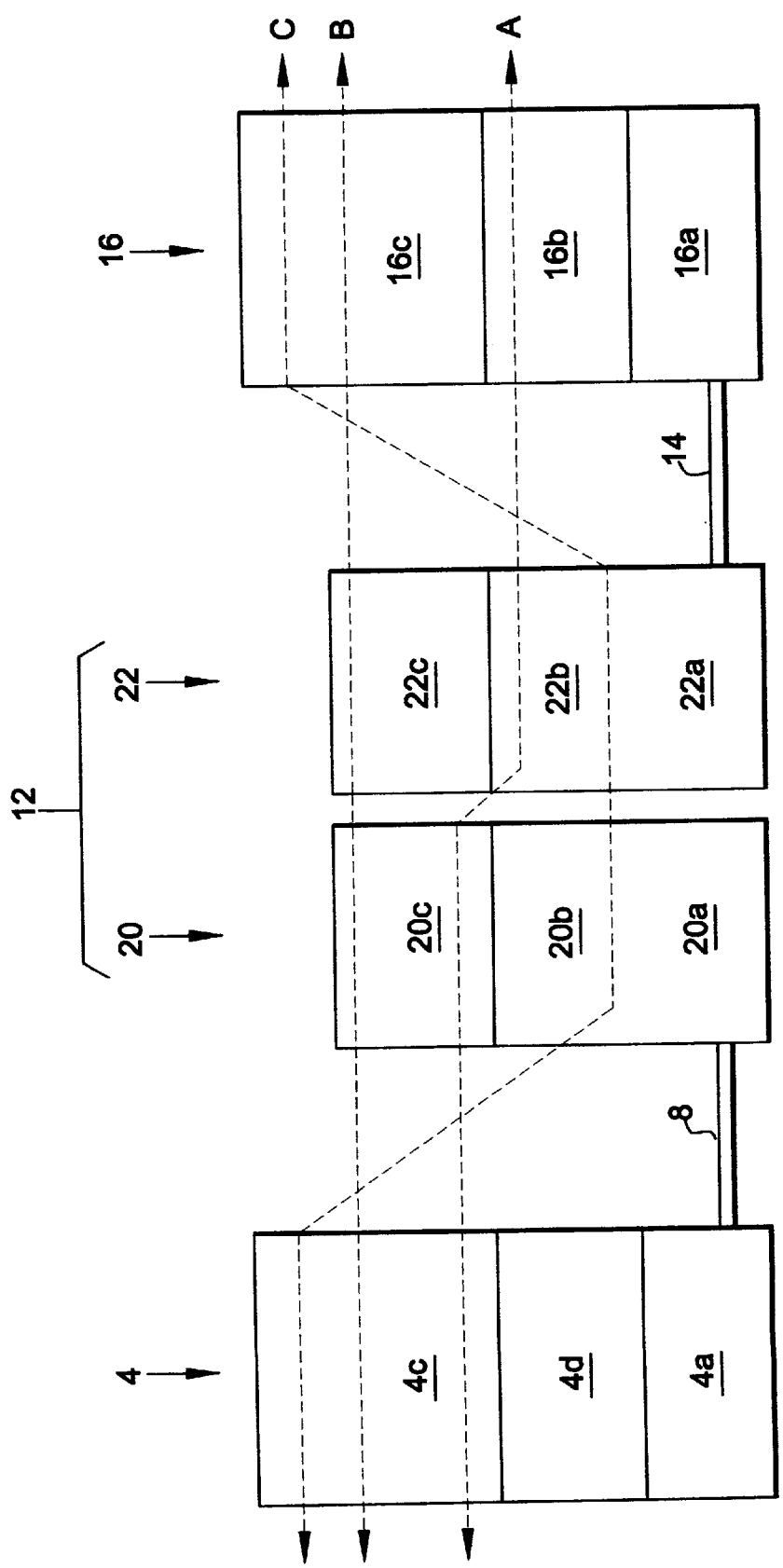
FIG. 2 is a diagram representing the data compression and error correction modes in operation in different embodiments of the invention.

FIG. 2 is a protocol layer diagram which explains the different modes of operation of the fixed MIU 12 in embodiments of the present invention. The fixed MIU 12 comprises a satellite link interface 20 and PSTN interface 22.

The satellite link interface 20 consists of a physical level 20a, in which data from the satellite link is decoded from an HDLC format. The format used for the satellite link is described in detail in British Patent Application No. 9506759.1, which is incorporated herein by reference. Likewise, data received from the PSTN interface 22 is converted at the physical level 20a to the satellite link format.

The mobile MIU 4 has a physical level 4a which converts data to and from the HDLC format.

At a higher level 20b, the satellite link interface 20 is operable in automatic error correction or ARQ (automatic repeat request) mode. In ARQ mode, data is sent to the satellite link in frames, which include cyclic redundancy check (CRC) bits.

When a data frame is received by the satellite link interface 20 from the satellite link, CRC bits are calculated for the received data and compared with the CRC bits which are received in the data frame. If there is a mismatch between the received and the calculated CRC bits, the satellite link interface 20 requests re-sending of that data frame. If the satellite link interface 20 is not operating in ARQ mode, the CRC is not used and data are passed unchecked on to the PSTN interface 22.

The mobile MIU 4 has an ARQ protocol level 4b which interacts with the ARQ level 20b of the satellite link interface 20, when ARQ mode is selected for the satellite link.

The satellite link interface 20 also has a data compression level 20c which compresses data received from the PSTN interface 22 and compresses the data before it is converted into the satellite link format at the physical level 20a. The data compression level 20c likewise decompresses data received over the satellite link, and sends the decompressed data to the PSTN interface 22. The mobile MIU 4 has a corresponding data compression level 4c which converts compressed data from the satellite link into uncompressed data and vice versa.

The PSTN interface 22 has a physical level 22a for converting data received from the satellite link interface 20 into a format suitable for transmission over the PSTN 14, and vice versa. The PSTN interface 22 also has an ARQ level 22b and a data compression level 22c, so that data may be exchanged with the PSTN 14 in ARQ mode and data compression mode respectively. Likewise, the modem 16 has a physical level 16a for data communication with the PSTN 14, an ARQ level 16b and a data compression level 16c.

Preferably, the ARQ levels 22b and 16b operate according to ITU-T recommendation V.42, and the data compression levels 4c, 20c, 22c and 16c operate according to ITU-T recommendation V.42bis. Conformity to the V.42 and V.42bis standards allows off-the-shelf software to be used at the modem 16 and PSTN interface 22, and conformity to the V.42bis standard allows transparent communication between the mobile MIU 4 and the modem 16, as explained below. The ARQ levels 4b and 20b preferably use the HDLC ARQ protocol.

If V.42bis data compression is selected for either the satellite link or the PSTN link, ARQ mode must also be selected for that link, because V.42bis data compression is highly sensitive to errors. For this reason, references to a data compression level being used will be understood to include the underlying ARQ level being used as well. Preferably, if ARQ mode is selected for one link, it is also selected for the other link.

In one mode, represented by the arrow A in FIG. 2, the mobile MIU 4 and satellite link interface 20 operate in data compression mode, indicated by the arrow A passing through data compression levels 4c and 20c. However, the PSTN interface 22 and the modem 16 exchange uncompressed data, indicated by the arrow A passing through levels 22b and 16b. Mode A is particularly advantageous where the modem 16 lacks data compression capability (i.e. level 16c is not present) and allows the modem 16 to operate at a higher data rate than can be supported by the satellite link.

In another mode, indicated by arrow B, the modem 16 is a V.42bis modem which exchanges compressed data with the PSTN interface 22, as shown by arrow B passing through 22c and 16c. Data sent over the PSTN 14 from the modem 16 is decompressed by the PSTN interface 22 and recompressed by the satellite link interface 20, at level 20c. The recompressed data is again decompressed by the mobile MIU 4, at level 4c.

Mode B allows off-the-shelf V.42bis modems to be used for the PSTN interface 22, since standard handshaking protocols may be used at the PSTN interface 22 when setting up data compression mode. However, the decompression and re-compression of data a the fixed MIU 12 may incur unacceptable delays.

Mode C overcomes this problem by disabling the data compression function of the fixed MIU 12, and allowing compressed data to pass transparently between the mobile MIU 4 and the modem 16. Error correction is still performed at the fixed MIU 12 by ARQ levels 20b and 22b, as different error correction protocols are used on each sub-link. Mode C avoids excessive delay and flow control problems at the fixed MIU 12. The fixed MIU 12 is involved in protocol negotiation during call set-up, as described in detail below.

Figure 3:
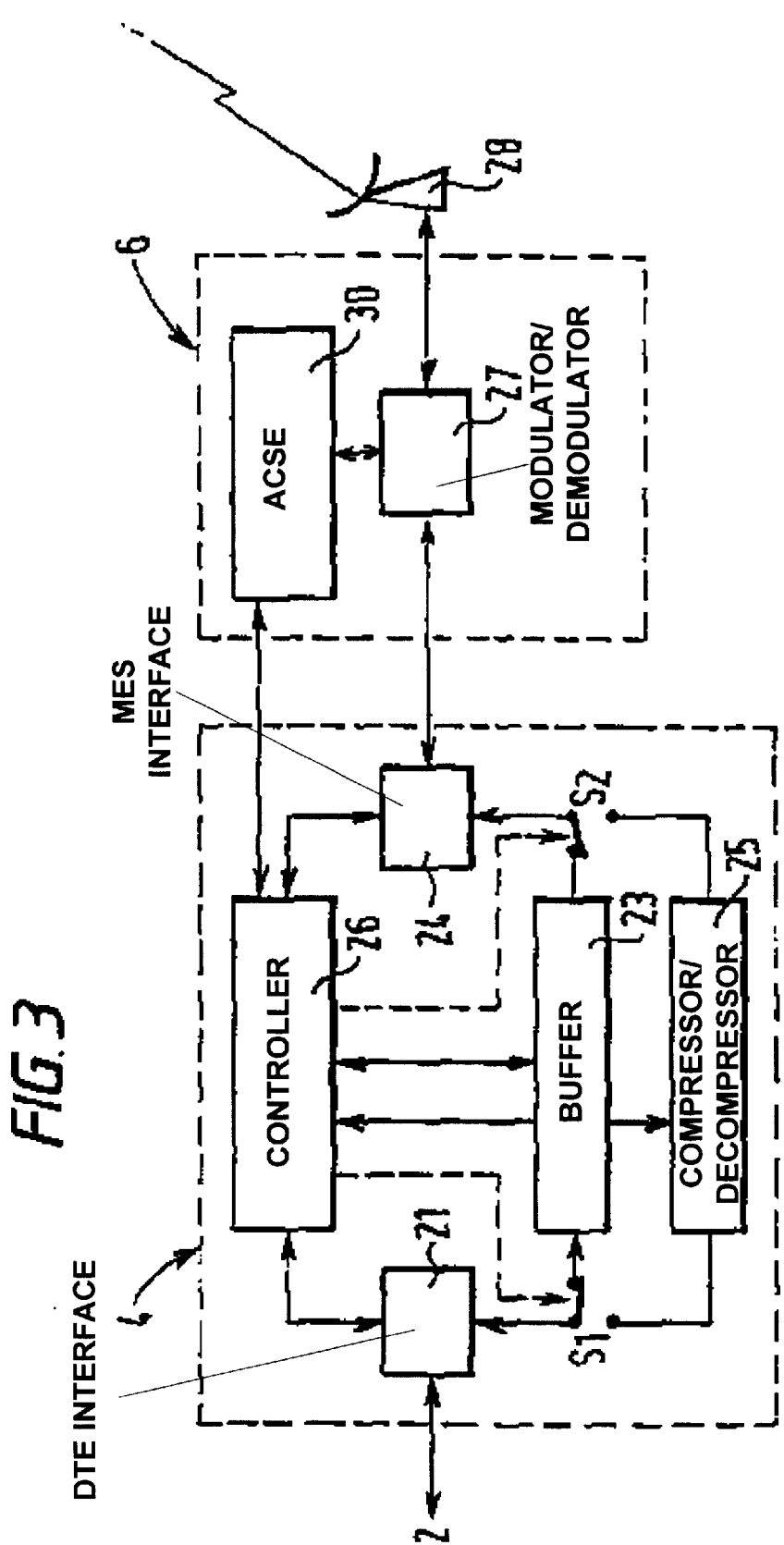
FIG. 3 is a functional block diagram of a mobile earth station and its associated interface to a data terminal.

FIG. 3 illustrates the functional parts of the mobile MIU 4 and the MES 6. The mobile MIU 4 comprises a DTE interface 21, which provides an RS232 physical interface and emulates an AT.PCCA type modem, i.e. it complies with the minimum functional specifications for data transmission systems published by the Portable Computer and Communications Association (PCCA), including the use of the AT command set and responses.

The mobile MIU 4 also comprises an MES interface 24, which is operable both in ARQ and non-ARQ mode and implements a variant of the HDLC (high level data link control) protocol, as defined by the ISO. Data exchanged between the DTE interface 21 and the MES interface 24 is stored in a buffer 23, when the mobile MIU 4 is not in compressed data mode.

In compressed data mode, data received by the DTE interface 21 is routed through a data compressor/decompressor 25, which compresses the data in accordance with recommendation V.42bis and outputs the compressed data to the MES interface 24. Likewise, compressed data received by the MES interface 24 is decompressed by the data compressor/decompressor 25 and output to the DTE interface 21. The selection of compressed data mode and non-compressed data mode is controlled by a controller 26, and is shown schematically by switches S1 and S2, which route data through the buffer 23 or the data compressor/decompressor 25. The controller 26 also supervises the operation of the interfaces 21 and 24 and of the buffer 23 and the data compressor/decompressor 25.

The MES 6 includes an RF modulator/demodulator 27, connected to an antenna 28, for RF modulating the output of the MES interface 24 and transmitting the output through the antenna 28 to the satellite 8, and for RF demodulating RF signals received from the satellite 8 through the antenna 28 and sending the demodulated signals to the MES interface 24. The MES also includes access control and signalling equipment (ACSE) 30, which interworks with the controller 26 of the mobile MIU 4 to set up and clear the satellite links.

The MES ACSE 30 communicates with a network control station (NCS, not shown) which supervises communications traffic through the satellite 8.

The mobile MIU 4, MES 6 and ACSE 30 are preferably integrated in a mobile unit.

From the above description, it will be seen that the physical level 4a and the ARQ level 4b of the mobile MIU 4 are implemented by the MES interface 24 and controller 26, while the data compression level 4c is implemented by the data compressor/decompressor 25 and the controller 26.

Figure 4:
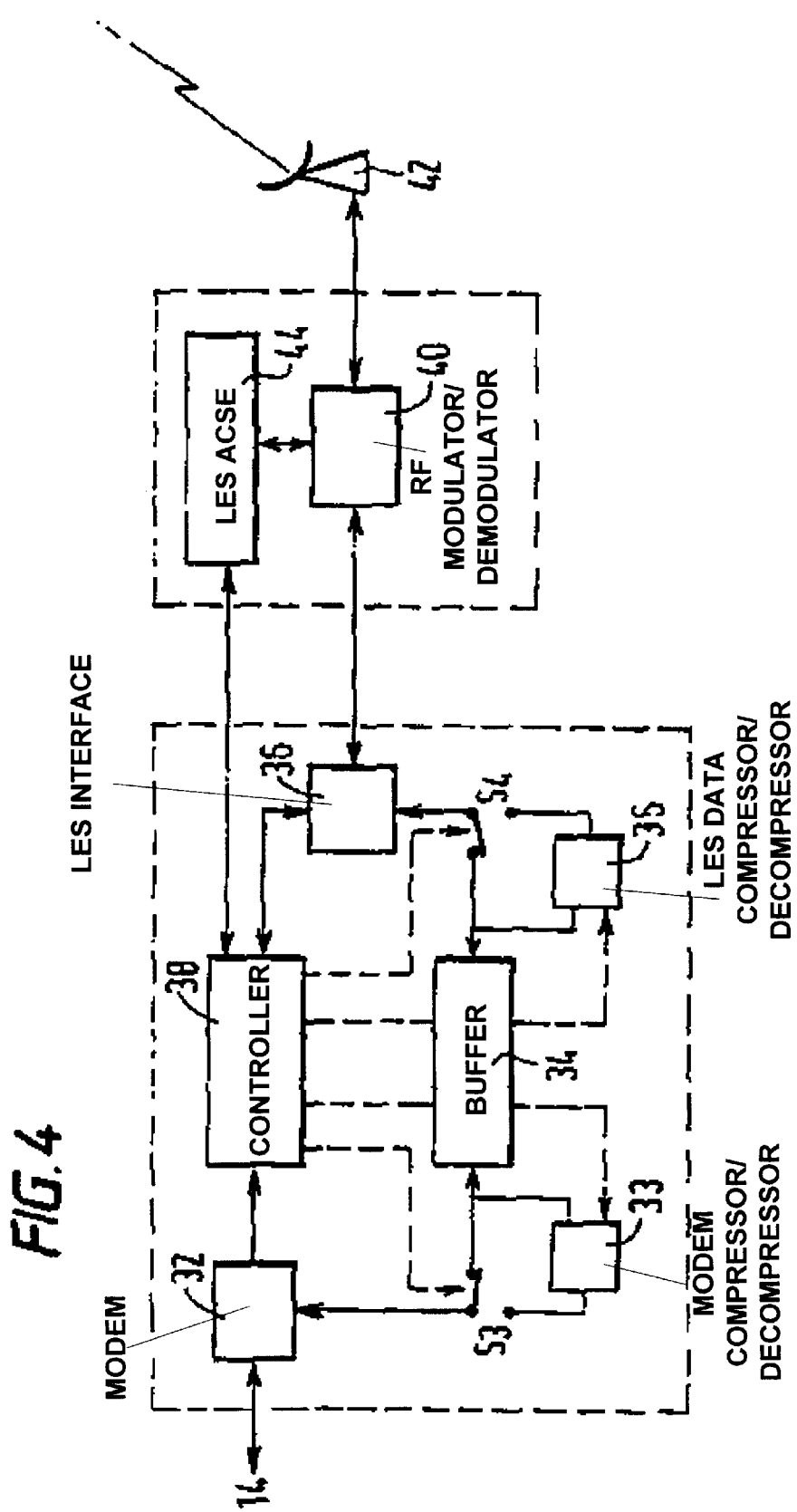
FIG. 4 is a functional block diagram of a fixed earth station and its associated interface to a PSTN.

The functional parts of the LES 10 and the fixed MIU 12 are illustrated in FIG. 4. The LES 10 includes a modulator/demodulator 40 connected to an antenna 42, for modulating and demodulating signals from the satellite 8. Call set-up and clearing are controlled by an LES ACSE 44 which interworks with the fixed MIU 12 and the network control station (NCS).

The fixed MIU 12 includes an LES interface 36 connected to the RF modulator/demodulator 40, which converts HDLC-type signals from the LES 10 to data and vice versa. The fixed MIU 12 also includes a modem 32 for conversion of analog signals from the PSTN 14 to digital signals and vice versa, and for implementing modem protocols, including V.42 error correction. Alternatively, the modem 32 may be replaced by a suitable ISDN or other network interface, depending on the network to which the fixed MIU 12 is to be connected.

The fixed MIU 12 also includes a buffer 34 connected between the modem 32 and the LES interface 36. When the PSTN interface 22 is in data compression mode; compressed data output by the modem 32 is input to a modem compressor/decompressor 33 which decompresses the data and outputs it to the buffer 34. Likewise, uncompressed data output by the buffer 34 is compressed by the modem compressor/decompressor 33 and output to the modem 32.

When the PSTN interface 22 is not in data compression mode, data is exchanged directly between the modem 32 and buffer 34. The selection of data compression mode or non-data compression mode is controlled by a controller 38, and the selection is shown symbolically by a switch S3 in FIG. 4.

When the satellite link interface 20 is in data compression mode, data output by the buffer 34 is compressed by an LES data compressor/decompressor 35, which outputs compressed data to the LES interface 36. Likewise, compressed data output by the LES interface 36 is decompressed by the LES compressor/decompressor 35 and output to the buffer 34. When the satellite link interface 20 is in non-compressed mode, data is exchanged directly between the buffer 34 and the LES interface 36. The selection of data compression mode in the satellite link interface 20 is controlled by the controller 38, and the selection of data compression mode is shown symbolically by the switch S4 in FIG. 4.

The physical level 20a and the ARQ level 20b of the satellite link interface 20 are implemented by the LES interface 36, while the data compression level 20c is implemented by the LES compressor/decompressor 35. The physical level 22a and the ARQ level 22b of the PSTN interface 22 are implemented by the modem 32, while the data compression level 22c is implemented by the modem compressor/decompressor 33.

In modes A and B shown in FIG. 2, the modem 32 and modem compressor/decompressor 33 may comprise a standard V.42bis modem.

The protocol negotiation phase of a data communication between the mobile DTE 2 and the fixed DTE 18 will now be described with reference to FIG. 5, in which the fixed DTE 18 initiates the call, and FIG. 6, in which the mobile DTE 2 initiates the call.

In either case, the mobile MIU 4 sends a return carrier ID signal 46 to the fixed MIU 12. The return carrier ID signal 46 is the last signal sent during the set-up of the satellite link.

Figure 5:
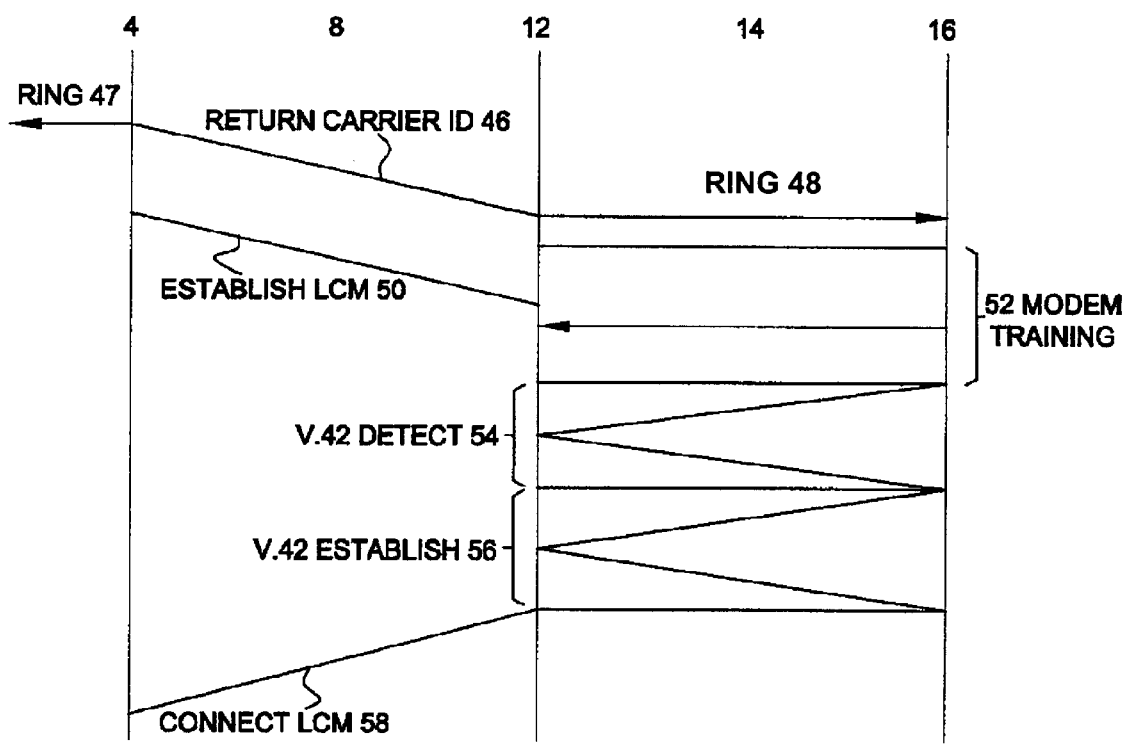
FIG. 5 is a time diagram of a protocol signal exchange during set-up of a data call originated from a fixed earth station.

In the fixed originated call shown in FIG. 5, a ringing signal 47 is sent to the mobile DTE 2. In response to receipt of the return carrier ID signal 46, the fixed MIU 12 sends a ringing tone 48 over the PSTN 14 to the modem 16, indicating that a connection has been made to the mobile MIU 4. The fixed MIU 12 then begins a modem training phase 52 with the modem 16. Meanwhile, an Establish line control message (LCM) 50 is sent by the mobile MIU 4 over the satellite link. The Establish LCM 50 contains information on the protocols which are supported by the mobile MIU 4 and which the user of the mobile DTE 2 wishes to establish. The Establish LCM 50 includes parameters for V.42bis compression, as shown in table 1 below.

TABLE 1

| Parameter No. | Value | Meaning |
| --- | --- | --- |
| e | 0 | Information unavailable |
|  | 1 | No error correction |
|  | 2 | V.42 error correction |
|  | 3 | V.42bis data compression satellite only |

TABLE 1-continued

| Parameter No. | Value | Meaning |
| --- | --- | --- |
|  | 4 | V.42bis end-to-end data compression with LES processing |
|  | 5 | V.42bis end-to-end data compression without LES processing |
|  | 6–255 | Not used |
| P1 | 0–511 | Not used |
|  | 512–65535 | No. of codewords in V.42bis dictionary |
| P2 | 0–5 | Not used |
|  | 6–250 | Maximum string length |
|  | 251–255 | Not used |

For parameter e, a value of 3 indicates a request for mode A in FIG. 2, value 4 indicates a request for mode B and value 5 indicates a request for mode C. Parameters P1 and P2 relate to compression over the satellite link; their meaning will be apparent from recommendation V.42bis. Their default settings are P1=512 and P2=6.

The modem training phase 52 is followed by a V.42 detection phase 54 in which the modem 16 indicates that V.42 error correction is supported, and the fixed MIU 12 responds with an instruction to use V.42 error correction (if the value of parameter e was 2, 3, 4 or 5) or not (e=0 or 1).

If the fixed MIU 12 indicates that V.42 error correction is to be supported, the modem 16 initiates a V.42 protocol establishment phase 56 by indicating the desired parameters for V.42 error correction, together with a request for V.42bis data compression, if this is supported. The fixed MIU 12 responds by accepting V.42bis data compression (if parameter e has the value of 4 or 5) or rejecting V.42bis data compression (if parameter e has the value 2 or 3). At the end of the V.42 protocol establishment phase 56, the fixed MIU 12 sends a Connect LCM 58, which indicates the parameters negotiated between the fixed MIU 12 and the modem 16, to the mobile MIU 4. Thus, for example, if the mobile MIU 4 requests end-to-end data compression, but the modem 16 does not support data compression, the fixed MIU 12 will indicate, through the Connect LCM 58, that data compression will be performed on the satellite link only. However, data compression is always available over the satellite link if requested in the Establish LCM 50.

Figure 6:
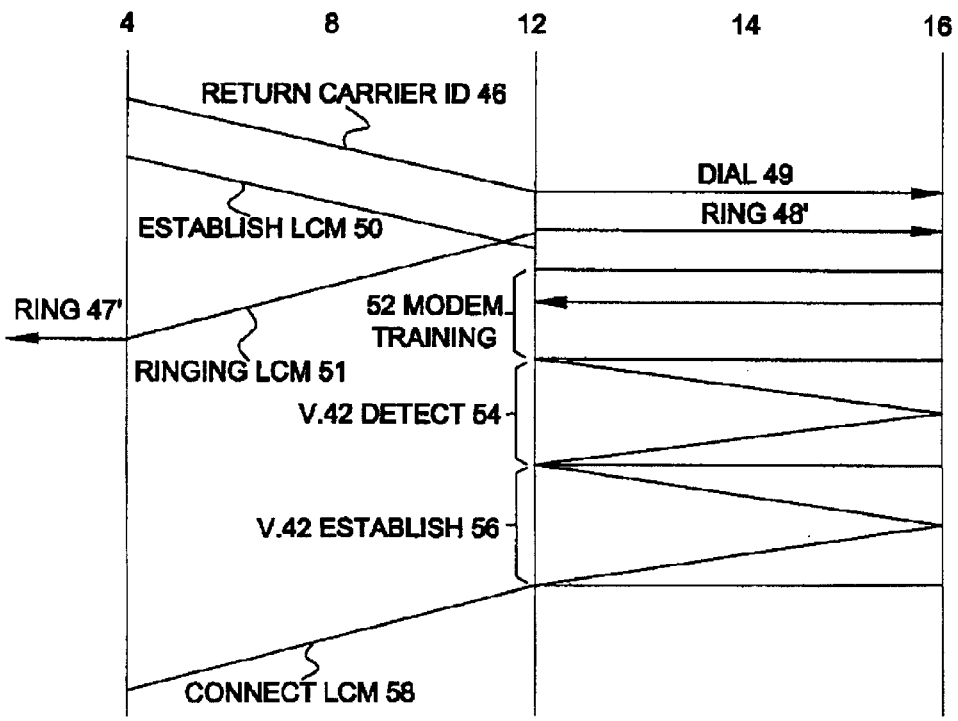
FIG. 6 is a time diagram of a protocol signal exchange during set-up of a data call originated from a mobile earth station.

In the mobile-originated call shown in FIG. 6, the Establish LCM 50, the training phases 52, 54 and 56 and the connect LCM 58 are sent in the same way as in the fixed-originated originated call shown in FIG. 5. However, in the mobile originated call, the fixed MIU 12 sends a dialling signal 49 to the PSTN 14 in response to receipt of the return carrier ID signal 46. The PSTN 14 sends a ringing signal 48' to the modem 16, to which the modem 16 responds by beginning the modem training phase 52. At the same time, the fixed MIU 12 sends a Ringing LCM 51 to the mobile MIU 4 to indicate that the modem 16 has been dialled, and the mobile MIU 4 responds by sending a ringing signal 47' to the mobile DTE 2.

In the protocol negotiation phase described above, ARQ mode can be selected for both or neither link, and the data compression mode can be selected for communication over the satellite link and/or over the PSTN 14. Preferably, if no data compression is selected for the satellite link, then no data compression is selected for the PSTN link.

In the above description, the modem interface units may either be separate units from the DTEs and earth stations or may be integrated with their respective earth stations. Furthermore, the mobile DTE 2, the MES MIU 4 and the MES 6 may all be incorporated in a single mobile unit.

The mobile MIU 4 and the MES 6 are referred to in conventional terminology as being "mobile", but they may in reality be fixed installations and may serve a local network which connects many DTEs to the MIU 4. The PSTN 14 may be replaced by a local network.

The present invention is not limited to data service systems of the INMARSAT-M (TM), INMARSAT mini-M (TM) or INMARSAT-B (TM) type. Instead, the present invention may be applied to other communication systems in which communication sub-links are connected together by an interface, and in particular to systems in which two sub-links operate at different data rates. For example, the present invention is applicable to interfaces between fixed networks and terrestrial cellular networks, such as GSM networks.

Furthermore, the present invention is not limited to system in which the V.42 and V.42bis protocols are implemented, but may be applied to other error correction and data compression protocols.

What is claimed is:

1. Data communications interface apparatus, comprising:
   a first interface for connection to a first communications link and a second interface for connection to a second, radio frequency, communications link and arranged to exchange data with the first interface, wherein the first interface is operable in both a compressed data communications mode in which the first interface applies a compression algorithm to data received from the second interface for output to the first communications link and applies a decompression algorithm to data received from the first communications link for output to the second interface, and in a non-compressed data communications mode in which data received from the second interface is output to the first communications link without a compression algorithm being applied thereto and data received from the first communications link is output to the second interface without a decompression algorithm being applied thereto.

2. Apparatus as claimed in claim 1, wherein the second interface is operable in both a compressed data communications mode in which the second interface applies a compression algorithm to data received from the first interface for output to the second communications link and applies a decompression algorithm to data received from the second communications link for output to the second interface, and in a non-compressed data communications mode in which data received from the first interface is output to the second communications link without a compression algorithm being applied thereto and data received from the second communications link is output to the first interface without a decompression algorithm being applied thereto.

3. Apparatus as claimed in claim 2, wherein the second interface is operable in the non-compressed mode only when the first interface is in the non-compressed mode.

4. Data communications interface apparatus, comprising:
   a first interface for connection to a first communications link and a second interface for connection to a second, radio frequency, communications link and arranged to exchange data with the first interface, wherein the second interface is operable in both a compressed data communications mode in which the second interface applies a compression algorithm to data received from the first interface for output to the second communications link and applies a decompression algorithm to data received from the second communications link for output to the first interface, and in a non-compressed data communications mode in which data received from the first interface is output to the second communications link without a compression algorithm being applied thereto and data received from the second communications link is output to the first interface without a decompression algorithm being applied thereto.

5. Apparatus as claimed in any preceding claim, wherein the first communications link is able to carry data at a higher rate than the second communications link.

6. Apparatus as claimed in claim 5, wherein the second communications link is a satellite communications link.

7. An earth station including apparatus as claimed in any one of claims 1 to 4 and 6.

8. A method of operating a data communications interface apparatus which comprises:
   a first interface for connection to a first communications link and a second interface for connection to a second, radio frequency, communications link, said method comprising:
   detecting whether a compressed data communications mode has been selected for the first interface, and, if so, applying a compression algorithm to data received from the second interface for output to the first communications link and applying a decompression algorithm to data received from the first communications link for output to the second interface; and, if not, outputting data received from the second interface to the first communications link without applying a compression algorithm to said data and outputting data received from the first communications link to the second interface without applying a compression algorithm to said data.

9. A method as claimed in claim 8, including detecting whether a compressed data communications mode has been selected for the second interface, and, if so, applying a compression algorithm to data received from the first interface for output to the second communications link and applying a decompression algorithm to data received from the second communications link for output to the first interface; and, if not, outputting data received from the first interface to the second communications link without applying a compression algorithm to said data, and outputting data received from the second communications link to the first interface without applying a decompression algorithm to said data.

10. A method as claimed in claim 9, wherein the compressed data communications mode is selected for the first interface only when the compressed data communications mode is also selected for the second interface.

11. A method of operating a data communications interface apparatus which comprises:
    a first interface for connection to a first communications link and a second interface for connection to a second radio frequency communications link, said method comprising:
    detecting whether a compressed data communications mode has been selected for the second interface, and, if so, applying a compression algorithm to data received from the first interface for output to the second communications link and applying a decompression algorithm to data received from the second communications link for output to the first interface; and, if not, outputting data received from the first interface to the second communications link without applying a compression algorithm to said data and outputting data received from the second communications link to the first interface without applying a decompression algorithm to said data.

12. A method as claimed in any one of claims 8 to 11, including exchanging data with the first communications link at a high bit rate and exchanging data with the second communications link at a low bit rate.

13. A method as claimed in any one of claims 8 to 11, wherein the second communications link is a satellite communications link.

14. A data communications interface apparatus for connection between a public switched telephone network (PSTN) and a radio frequency (RF) communications network, comprising:

a PSTN interface for connection to said PSTN and an RF interface for connection to said RF network, the PSTN interface and RF interface being connected together to enable communications between a first user terminal connected to said PSTN and a second user terminal connected to said RF network;

the data communications interface apparatus having a selector for controlling said PSTN interface selectively to operate in either a compressed PSTN interface mode in which the PSTN interface applies a compression algorithm to data received from the RF interface for output to the PSTN and applies a decompression algorithm to data received from the PSTN for output to the RF interface, or in a non-compressed PSTN interface mode in which data received from the RF interface is output to the PSTN without a compression algorithm being applied thereto and data received from the PSTN is output to the RF interface without a decompression algorithm being applied thereto.

15. A data communications interface apparatus for connection between a public switched telephone network (PSTN) and a radio frequency (RF) communications network, comprising:

a PSTN interface for connection to said PSTN and an RF interface for connection to said RF network, the PSTN interface and RF interface being connected together to enable communications between a first user terminal connected to said PSTN and a second user terminal connected to said RF network, the data communications interface apparatus having a mode selector for controlling said RF interface selectively to operate in either a compressed RF interface mode in which the RF interface applies a compression algorithm to data received from the PSTN interface for output to the RF network and applies a decompression algorithm to data received from the RF network for output to the PSTN interface, or in a non-compressed RF interface mode in which data received from the PSTN interface is output to the RF network without a compression algorithm being applied thereto and data received from the RF network is output to the PSTN interface without a decompression algorithm being applied thereto.

16. A method of operating a data communications interface apparatus for connection between a public switched telephone network (PSTN) and a radio frequency (RF) communications network, the data communications interface apparatus having a PSTN interface for connection to said PSTN and an RF interface for connection to said RF network, the PSTN interface and RF interface being connected together to enable communications between a first user terminal connected to said PSTN and a second user terminal connected to said RF network, said method comprising the steps of:

detecting whether a compressed PSTN interface mode or a non-compressed PSTN interface mode has been selected for the PSTN interface and in said compressed PSTN interface mode applying a compression algorithm to data received from the RF interface for output to the PSTN and applying a decompression algorithm to data received from the PSTN for output to the RF interface and, in said non-compressed PSTN interface mode, outputting data received from the RF interface to the PSTN without applying a compression algorithm to said data and outputting data received from the PSTN to the RF interface without applying a decompression algorithm to said data.

17. A method of operating a data communications interface apparatus for connection between a public switched telephone network (PSTN) and a radio frequency (RF) communications network, the data communications interface apparatus having a PSTN interface for connection to the said PSTN and an RF interface for connection to said RF network, the PSTN interface and RF interface being connected together to enable communications between a first user terminal connected to said PSTN and a second user terminal connected to said RF network, said method comprising the steps of:

detecting whether a compressed RF interface mode or a non-compressed RF interface mode has been selected for the RF interface, and in said compressed RF interface mode, applying a compression algorithm to data received from the PSTN interface for output to the RF network and applying a decompression algorithm to data received from the RF network for output to the PSTN interface; and, in said non-compressed RF interface mode, outputting data received from the PSTN interface to the RF network without applying a compression algorithm to said data and outputting data received from the RF network to the PSTN interface without applying a decompression algorithm to said data.

* * * * *

UNITED STATES PATENT AND TRADEMARK OFFICE
CERTIFICATE OF CORRECTION

PATENT NO.    : 6,205,173 B1
DATED         : March 20, 2001
INVENTOR(S)   : Joan Obradorss et al.

It is certified that error appears in the above-identified patent and that said Letters Patent is hereby corrected as shown below:

<u>Column 8,</u>
Line 57, -- , -- has been inserted after the word "second"
Line 58, -- , -- has been inserted after the word "frequency".

Signed and Sealed this

Tenth Day of September, 2002

Attest:

JAMES E. ROGAN
Attesting Officer          Director of the United States Patent and Trademark Office

UNITED STATES PATENT AND TRADEMARK OFFICE
CERTIFICATE OF CORRECTION

PATENT NO.     : 6,205,173 B1
DATED          : March 20, 2001
INVENTOR(S)    : Joan Obradorss et al.

It is certified that error appears in the above-identified patent and that said Letters Patent is hereby corrected as shown below:

<u>Title page,</u>
Item [73], Assignee: "International Mobile Satellite Organization (GB)" has been replaced with -- Inmarsat, Ltd. (GB) --

Signed and Sealed this

Twenty-fifth Day of February, 2003

JAMES E. ROGAN
*Director of the United States Patent and Trademark Office*